United States Patent [19]
Korrenn et al.

[11] 3,779,626
[45] Dec. 18, 1973

[54] ASTRONOMICAL TELESCOPE

[75] Inventors: Heinz Korrenn, Schweinfurt; Horst Voll, Obertheres; Harald Grubel, Schweinfurt, all of Germany

[73] Assignee: Kugelfischer Georg Schafer & Co., Schweinfurt, Germany

[22] Filed: Oct. 25, 1972

[21] Appl. No.: 300,860

[30] Foreign Application Priority Data
Oct. 29, 1971 Germany............... P 21 54 087.4

[52] U.S. Cl.................. 350/85, 350/83, 308/160
[51] Int. Cl. ......................................... G02b 23/16
[58] Field of Search ............. 350/83, 85; 308/160

[56] References Cited
UNITED STATES PATENTS
2,212,346   8/1940   Kroon................................ 350/83
3,545,828  12/1970   Korrenn............................ 308/160
3,552,810   1/1971   Korrenn............................ 308/160

Primary Examiner—David H. Rubin
Attorney—Richard K. Stevens et al.

[57] ABSTRACT

An astronomical telescope is disclosed having a tube mounted to pivot about a declination axis, the tube being held free of play by means of two laterally projecting trunnions, co-axial with the declination axis, disposed in the two limbs of a fork, in bearings which are axially pre-loaded away from each other, and in which each trunnion is rotatably mounted in an associated limb of the fork by means of an enclosed fluid-tight hydrostatic self-aligning bearing, with spherically curved mutually facing bearing surfaces of which the common center of curvature lies on the declination axis, the two bearings being axially mutually pre-loaded apart by virtue of the elasticity of the fork. At least one of the bearings is axially adjustable in the associated limb of the fork along the declination axis.

3 Claims, 1 Drawing Figure

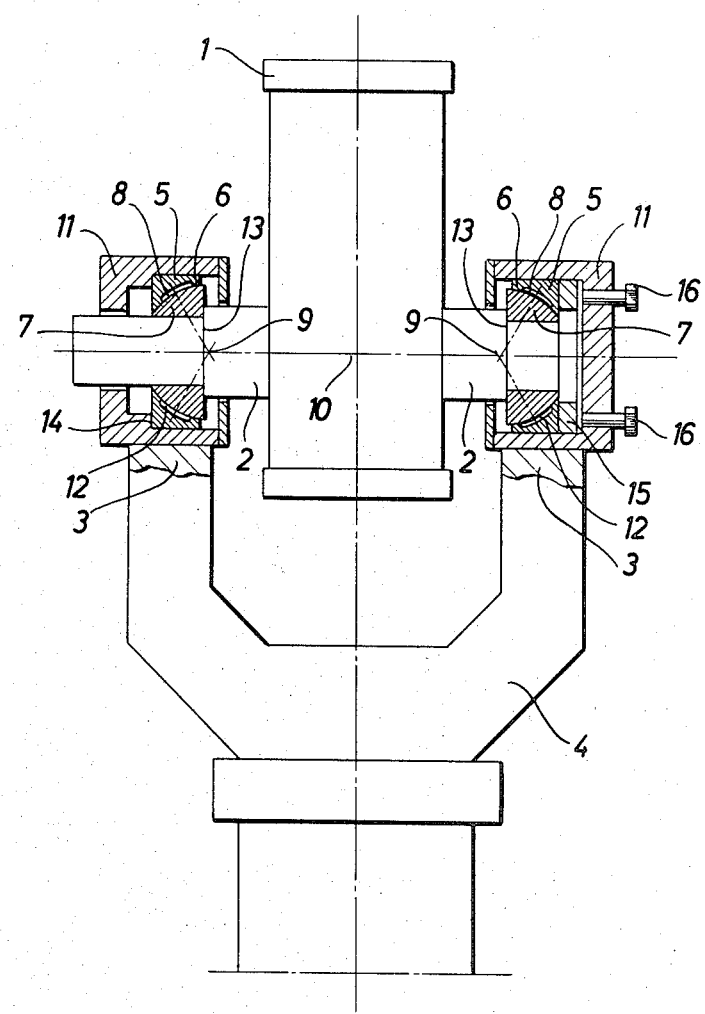

ASTRONOMICAL TELESCOPE

The invention relates to an astronomical telescope having a tube mounted to pivot about a declination axis and which is held free of play on two laterally projecting trunnions, co-axial with the declination axis, in the two limbs of a fork in bearings which are axially pre-loaded away from each other.

As is well known, the objective tube of an astronomical reflecting telescope is capable of being turned or pivoted about a polar axis and a declination axis. In the mounting of the kind mentioned above, for pivoting about the declination axis ball or roller bearings have hitherto always been used; in fact in the form of a self-aligning bearing in each limb of the fork. Alternatively, inclined ball bearings in an X-shaped layout are also known, which likewise permits small self-aligning movements. In order to achieve high accuracy the bearings are installed without play, and moreover are pre-loaded axially against each other.

Drawbacks in these declination axis bearings have been the indeterminate loading of the bearings in the different operating positions of the objective tube, jamming of the bearings by inaccuracies and elastic deformation of the surrounding components, the non-uniform and relatively large friction in the bearings, arising from the mutual pre-loading of the bearings, the occurrence of stick-slip effects at very low speeds, the difficulty of achieving play-free operation and the relatively low stiffness of the bearings, all of which drawbacks adversely affect the accuracy of the telescope, i.e., they affect and make difficult the accurate adjustment of the position of the objective tube by pivoting about the declination axis.

It is the object of this invention to overcome these drawbacks. This object is achieved in an astronomical telescope of the kind indicated above by an arrangement wherein each trunnion is rotatably mounted in each associated limb of the fork by means of an enclosed fluid-tight hydrostatic self-aligning bearing with spherically curved mutually facing bearing surfaces of which the common center of curvature lies on the declination axis, the two bearings axially being mutually pre-loaded apart by virtue of the elasticity of the fork. In this way a low and uniform friction, insensitivity to inaccuracies of the surrounding components, easy adjustability of the two bearings with respect to each other, clear and always measurable bearing loading, high stiffness, and high accuracy are readily achieved with simple and easily controlled construction.

Preferably, at least one of the bearings is axially adjustable in its associated limb of the fork along the declination axis so that a predetermined axial mutual pre-loading of the bearings can be easily attained.

It has already been proposed to provide a hydrostatic bearing for pivoting the objective tube about the polar axis. For examples of bearings suitable for that purpose, see U.S. Pat. Nos. 3,545,828 and 3,552,810 to one of us. However, objections of a technical nature exist against the use of hydrostatic bearings for the mechanism of the declination axis. More particularly, contamination of the mirror by the oil under pressure used for the hydrostatic bearing and damaging effects resulting from the additional heat were feared. Moreover, a relatively complicated construction was regarded as unavoidable in order to be able to meet all the foregoing requirements. This technical prejudice has been overcome by the present invention. As revealed by tests, the drawbacks that were feared do not arise.

A preferred embodiment of the astronomical telescope according to the present invention is described hereinafter by way of example and with reference to the accompanying drawing in which the single FIGURE is a partially longitudinally sectioned side elevation of the reflecting tube of the telescope mounted so as to pivot in a fork about the declination axis.

The reflecting tube 1 has two laterally projecting extensions 2 which are co-axial with the declination axis, and by which the tube is held in the two limbs 3 of a fork 4, in respective hydrostatic self-aligning bearings.

Each bearing comprises an outer ring 5 with a spherically curved bearing surface 6 and an inner ring 7 with a spherically curved bearing surface 8. The bearing surfaces 6 and 8 of each bearing face each other and have a common center of curvature 9 which lies on the declination axis 10.

The inner ring 7 of each bearing is seated on the extension or trunnion 2, while the outer ring 5 is seated in a housing 11 on the free end of a limb 3 of the fork. The bearing surface 6 of each outer ring 5 is provided with pockets 12 which are exposed or subjected to a fluid medium, preferably oil, under pressure so that the cushions of the fluid medium are formed between the bearing surface 6 and the opposed bearing surface 8 of the adjacent inner ring 7. The fluid medium escaping from the pockets 12 reaches the interior of the respective housing 11 and is removed from there in conventional manner not shown for the sake of simplicity. The supply and exhaust connections for the fluid medium are not shown as they too are quite conventional.

Each housing 11 is sealed off from the associated trunnion 2 so that no fluid medium can escape.

The centers of curvature 9 of both the bearings lie on the declination axis between the two bearings and so the two bearings can be pre-loaded away from each other. The two inner rings 7 each abut against a respective annular shoulder 13 on the associated trunnion 2. The outer ring 5 of the left-hand bearing (as shown in the drawing) lies against an annular shoulder 14 on its associated housing 11. The right-hand outer ring 5 is supported with respect to its associated housing 11 through an adjusting ring 15 which is axially displaceable in the right-hand housing 11 by means of adjusting screws 16 screwed into the right-hand housing 11.

By means of the adjusting screws 16 a predetermined mutual axial pre-loading of the two hydrostatic floating bearings with respect to each other can be set, with the fork 4 deforming elastically, i.e., with the limbs 3 resiliently springing apart as the loading on the bearings is increased. The preloading can for example be read in terms of pressure on a manometer which is connected to the pockets 12 of one of the hydrostatic bearings. The loading can be adjusted subsequently or corrected with minimum trouble and imparts freedom from play in the bearings in all positions of the objective tube 1 and the maximum possible stiffness of the declination axis bearing. This bearing is distinguished moreover by the very low and uniform friction, free adjustability of the two hydrostatic self-aligning bearings with respect to each other, a high degree of insensitivity to inaccuracies in the surrounding components, and clear and always measurable bearing loads, which all contribute to the achievement of high accuracy of the telescope.

What is claimed is:

1. An astronomical telescope having a tube mounted to pivot about a declination axis, the tube being held free of play by means of two laterally projecting trunnions, co-axial with the declination axis, disposed in the two limbs of a fork, in bearings which are axially pre-loaded away from each other, and in which each trunnion is rotatably mounted in an associated limb of the fork by means of an enclosed fluid-tight hydrostatic self-aligning bearing, with spherically curved mutually facing bearing surfaces of which the common center of curvature lies on the declination axis, the two bearings being axially mutually pre-loaded apart by virtue of the elasticity of the fork.

2. A telescope according to claim 1 in which at least one of the bearings is axially adjustable in the associated limb of the fork along the declination axis.

3. A telescope according to claim 2, wherein the declination axis is horizontal and the axial adjustment of the bearings is obtained by means of at least three adjusting screws serving to move an adjusting ring against a bearing surface.

* * * * *